United States Patent [19]

Elson

[11] 4,183,481

[45] Jan. 15, 1980

[54] PARACHUTE DROPPING KITE

[76] Inventor: Lloyd C. Elson, 675 Rymal Rd. E., Hamilton, Ontario, Canada

[21] Appl. No.: 872,225

[22] Filed: Jan. 25, 1978

[51] Int. Cl.² .......................................... B64C 31/06
[52] U.S. Cl. ............................................. 244/155 R
[58] Field of Search ............. 244/153 R, 155 A, 147; 46/1 H, 77, 76 R, 86 R, 86 A, 86 B, 86 C

[56] References Cited

U.S. PATENT DOCUMENTS

| | | | |
|---|---|---|---|
| 881,417 | 3/1908 | Kruger | 244/155 R |
| 1,134,884 | 4/1915 | Mackay | 244/147 |
| 1,735,309 | 11/1929 | Albrecht | 244/155 R |
| 1,804,244 | 5/1931 | Brady | 244/155 R |
| 2,464,720 | 3/1949 | Rose | 244/155 R |
| 2,480,948 | 9/1949 | Moon | 244/155 R |
| 2,575,157 | 11/1951 | Berthene | 244/155 R |
| 2,923,090 | 2/1960 | Jones | 46/86 C |

*Primary Examiner*—Galen L. Barefoot

[57] ABSTRACT

A parachute dropping kite comprising a parachute unit pocketed or strapped to the underside of the covering of the kite. The strap or pocket is provided with appropriate closure means removably and frictionally associated therewith. A closure means string has one portion thereof secured to the closure means and another portion thereof secured to the kite string at a position proximal to but spaced from the kite at a length such that the closure means string is slack when the closure means is associated with the parachute holding means during flight of the kite. The device is further provided with a kite string length changing means which is associated with and actuable by tugging on the kite string, and located at the position on the kite string where the closure means string is secured to the kite string or between that position and the kite. When the kite string is tugged, the kite string length changing means is actuated to lengthen the kite string such that closure means string is lengthened and the closure means is removed from the holding means, permitting the parachute to drop from the strap or pocket.

15 Claims, 5 Drawing Figures

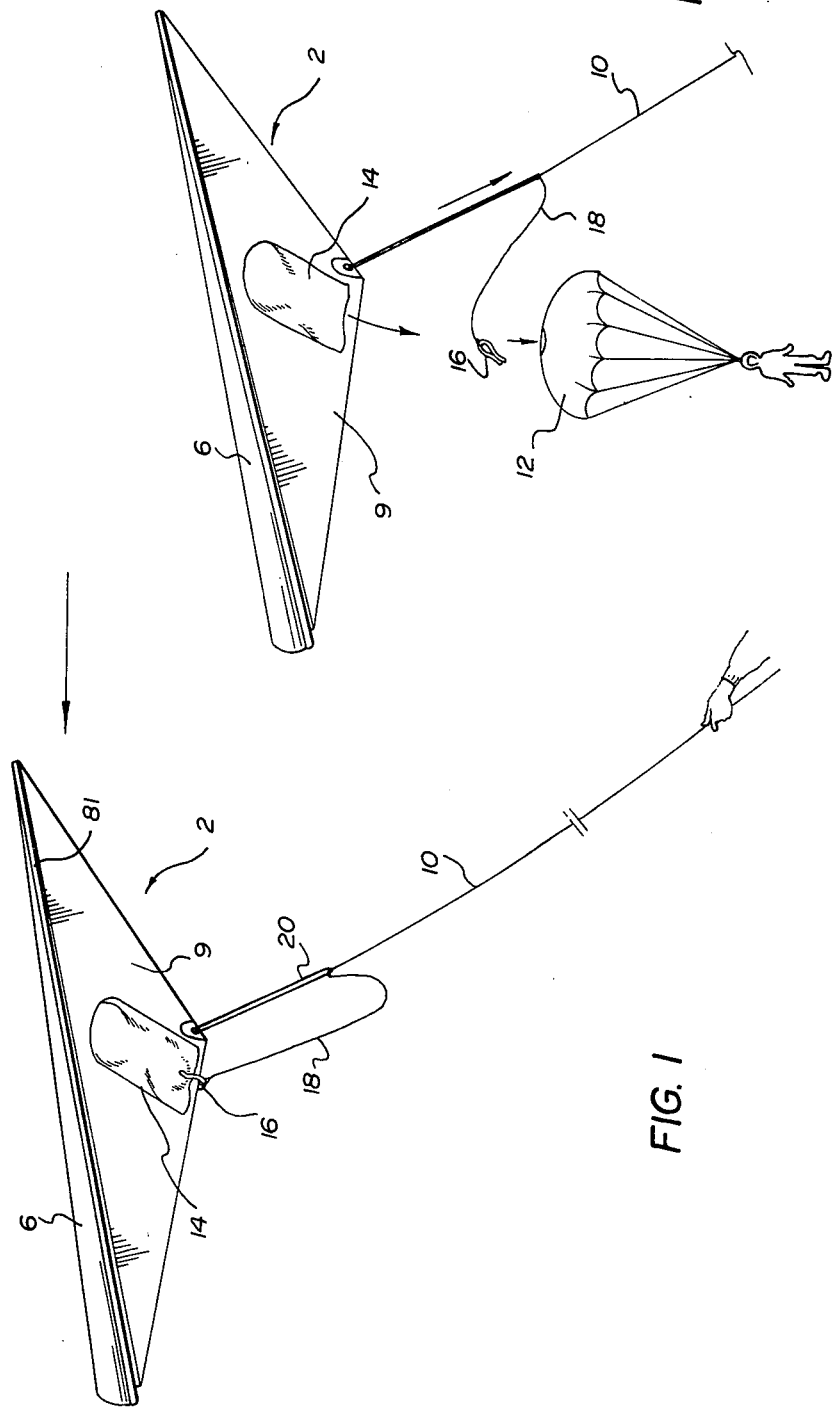

PARACHUTE DROPPING KITE

BACKGROUND OF THE INVENTION

This invention relates to a parachute dropping kite, and more particularly relates to a kite which may be flown with one or more parachute units releasably secured to its covering and which, by a mere tug on the kite string, will release the parachute to fall to the ground.

Parachute dropping kites of various constructions are known in the art. For example, numerous devices have been described and illustrated whereby a parachute device rides up the kite string to a kite being flown hits a stop secured at a location near the kite on the kite string and is released by an appropriate mechanism cooperating with that stop, to fall to the ground. Examples of such devices are found in Shepard, Canadian Pat. No. 179,666, issued Oct. 9, 1917; Silverthorn, Canadian Pat. No. 234,288, issued Sept. 18, 1923 and Jacobi, U.S. Pat. No. 1,787,479, issued Jan. 6, 1931. Such string-carried parachute devices require relatively cumbersome and complicated carriage means to permit them to be elevated up the string of a kite in flight. The Jacobi kite requires three strings running upwards from the ground, one being the main kite string and the other two being strings to lift the parachute carriage along that string and to release a kite release mechanism associated with that carriage.

Berthene, U.S. Pat. No. 2,575,157, issued Nov. 13, 1951 describes a parachute dropping kite in which one or more parachute devices are held within an open cylindrical capsule carried by the kite. A slowly deflating balloon within the capsule, wedging the kites against the inner edges of the capsule, acts as a time release mechanism: when the balloon reaches a certain minimum size, the parachute device is dropped from the capsule. Albrecht, U.S. Pat. No. 1,735,309, issued Nov. 12, 1929 describes another type of kite carrying encapsulated parachute devices. A slidable door, lifted by means of a string running to the ground, enables the person flying the kite to open downwardly slanting capsules and permit the parachutes to drop out from them. Both of these devices, however, are of complicated construction and sufficiently cumbersome to operate and expensive to build that they are virtually impractical for the purpose for which they were designed.

U.S. Pat. No. 3,430,899, of Zopf, issued Mar. 4, 1969 describes a kite with a detachable parachute or glider device on its upper surface. As in the Albrecht device, a second string paralling the main kite string runs from a releasable clip securing the detachable member to the main body of the kite to the ground. The detachable member is released by pulling this second string.

Fisher, U.S. Pat. No. 2,059,634, issued Nov. 3, 1936 describes and illustrates a parachute dropping kite in which the parachute is carried aloft dangling from a releasable wire spring member secured to the lower portion of the kite frame. In this device, the main kite string is used to activate a spring release mechanism. The spring member when released, enables the parachute to drop off it.

Both the Zopf and Fisher devices again require relatively intricate release mechanisms for the parachute member. The Fisher parachute dangling from the frame secured release mechanism as the kite is lifted into the air to some extent hinders the normal operation of the kite. As well, the opened spring member, once the parachute of the Fisher device is released, provides a potential hazard to anyone in the vicinity of where the kite is being used in the event of a sudden descent of the kite, protruding as it does when it has been released.

Other references of general background interest are Toth, U.S. Pat. No. 2,822,998, issued Feb. 11, 1958 and Astle, Canadian Pat. No. 391,427, issued Sept. 24, 1940.

It is an object of the present invention to provide a simply constructed, economical parachute dropping kite which is at least as effective as those prior art devices hereinbefore described. It is a further object of the present invention to provide such a parachute dropping kite having a release mechanism which operates in association with, and is activated through, the kite string and does not require a second string, running to the kite from the ground, for actuation. It is a further object of the present invention to provide a parachute dropping kite in which the parachute is carried aloft in close association with the kite covering to reduce its effect on the aerodynamic performance of the kite.

SUMMARY OF THE INVENTION

In accordance with the present invention, a parachute dropping kite is provided comprising a parachute unit associated with a kite having a frame and covering secured thereto. The parachute unit is releasably secured to the covering on the underside of the kite by a holding means such as a pocket or a strap. A closure means is removably and frictionally associated with that holding means. A closure means string is provided, with one portion thereof being secured to the closure means and another portion thereof secured to the kite string at a position proximal to but spaced from the kite and of a length between these portions such that the closure means string is slack when the closure means is associated with the holding means during flight of the kite. The device is further provided with a kite string length changing means associated with the kite string at the position where the closure means string is secured to the kite string or between that position and the kite, actuable by tugging on the kite string when the kite is in flight, to lengthen the kite string such that the closure means string becomes tightened and removes the closure means from the holding means to release the parachute. Where the parachute holding means is a pocket, the closure means may be a clip removably secured to the covering of the kite to close the opening of the pocket; where the holding means is a strap, one end thereof may be permanently secured to the covering and the other end may be releasably secured to the covering by means of an appropriate closure means such as a pin.

The parachute dropping kite according to the present invention is extremely economical to construct, relative to other such prior art devices, and simple to operate, requiring merely a tug on the main kite string to actuate the kite string length changing means and release the closure means to free the parachute from the holding means of the kite. The parachute may therefore be released at the command of the person flying the kite.

BRIEF DESCRIPTION OF THE DRAWINGS

Other objects and advantages of the present invention will become apparent upon reading the following detailed description and upon referring to the drawings in which:

FIGS. 1 and 2 are side views of an example embodiment of a parachute dropping kite according to the present invention illustrating respectively secured and removed closing means for a pocket in which the parachute is held, and an associated kite string length changing means;

In the references, similar features have been given similar reference numerals.

Figure 3:
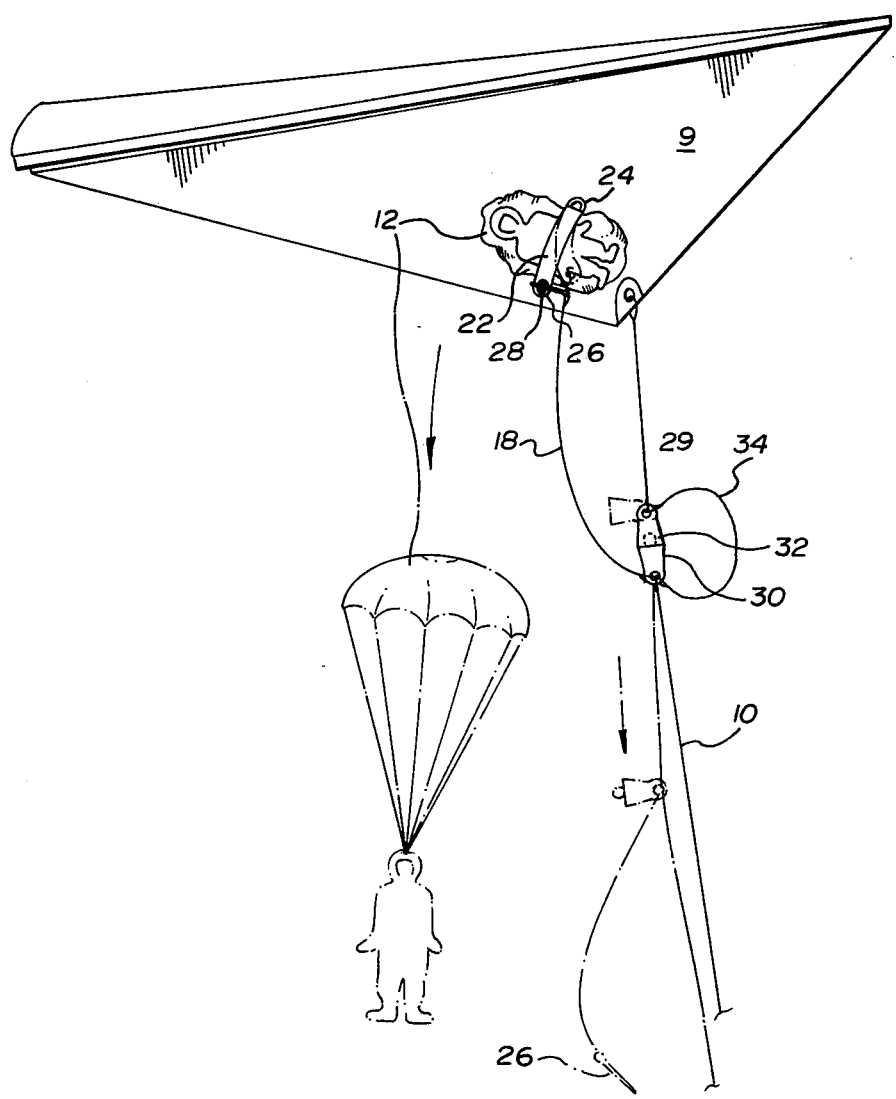
FIG. 3 is a side view of a further embodiment of a parachute dropping kite according to the present invention wherein the parachute is held to and released from (in phantom) the underside of the kite covering by means of a strap.

While the invention will be described in connection with example embodiments thereof, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, there is shown a parachute dropping kite 2 comprising a kite having covering 6 and frame 8 made of any appropriate rigid members. The term "covering" as used herein and in proceeding portions of this specification is intended to refer to the fabric or sheet material associated with the frame of the kite, and, where the kite has a guide 9 made from such fabric or sheet material as in the type of kite illustrated in the drawings, this term is intended to cover such guide. Kite string 10 extends from the kite to the operator on the ground below. A parachute unit 12, of any appropriate construction, as seen in FIG. 2 leaving the kite, is associated with the kite 2.

The parachute unit 12 is releasably secured to kite covering 6 at guide 9 by any appropriate holding means, this being shown, in FIGS. 1 and 2, to be pocket 14, downwardly oriented when the kite is in flight orientation. As shown in FIG. 1, the opening of the pocket is held closed, to hold the parachute within pocket 14, by an appropriate closure means shown to be clip 16. This clip is designed to be releasable from its position shown in FIG. 1 by a downwardly applied force while the kite is in flight. This action is achieved by means of closure means string 18 and elastic 20, which constitutes the upward terminal end of kite string 10 and, as will be described hereinafter, operates as a kite string length changing means. During normal operation of the kite while the parachute is to be maintained within pocket 14, string 18 remains slack, elastic 20 stretching only a litle from normal wind action on the kite as the kite is flown. Thus, clip 16 stays in clamped position across the opening of pocket 14. Of course the slackness of string 18 and elasticity of elastic 20 can be selected according to particular wind conditions. When it is desired to release parachute unit 12 from pocket 14, a sufficient tug on kite string 10 stretches elastic 20, tightens string 18 and applies sufficient force to clip 16 to remove it from its position across the opening of pocket 14. As shown in FIG. 2, the parachute is then free to fall from pocket 14. While only a single pocket is shown on guide 9 in these figures, and those which will be hereinafter described, it is of course possible to provide a corresponding pocket on the other side of guide 9, or even additional pockets on the same side or both sides of the kite guide with an appropriate clip or clips 16. In the case of multiple pockets, of course, closure means strings of appropriate length would be provided.

Turning to FIG. 3 an alternative embodiment of parachute dropping kite 2 is illustrated in which parachute unit 12 is secured to guide 9 by means of strap 22. End 24 of strap 22 is permanently fixed to guide 9 while end 26 is releasably secured thereto by means of any appropriate securing means such as, for example, pin 28. Instead of an elastic kite string length changing means, as in the embodiment of FIGS. 1 and 2, the kite of FIG. 3 uses a snapped-together two-piece clamp 29. Male lug 30 is releasably securable in female socket 32, each piece of the clamp being secured to spaced positions along the upper end of kite string 10 at or above the position where closure means string 18 is secured to kite string 10. When the two pieces of clamp are in snapped-together position as shown in FIG. 3, loop 34 is formed in kite string 10 and closure means 18 is slack so that no force would normally be exerted to remove pin 28 from its position securing end 26 of strap 22 to kite guide 9 while the kite is being flown. The lug 30 is held within socket 32 against unpurposeful disengagement during normal flying conditions of the kite. When it is desired to remove pin 28 and free parachute unit 12 to fall to the ground, the operator tugs kite string 10 to separate the two pieces of clamp. Loop 34 disappears as the kite string, along this section, straightens up. This action in turn tightens string 18 to pull pin 28 out and permit the parachute unit 12 to fall to the ground.

Figures 4A, 4B:
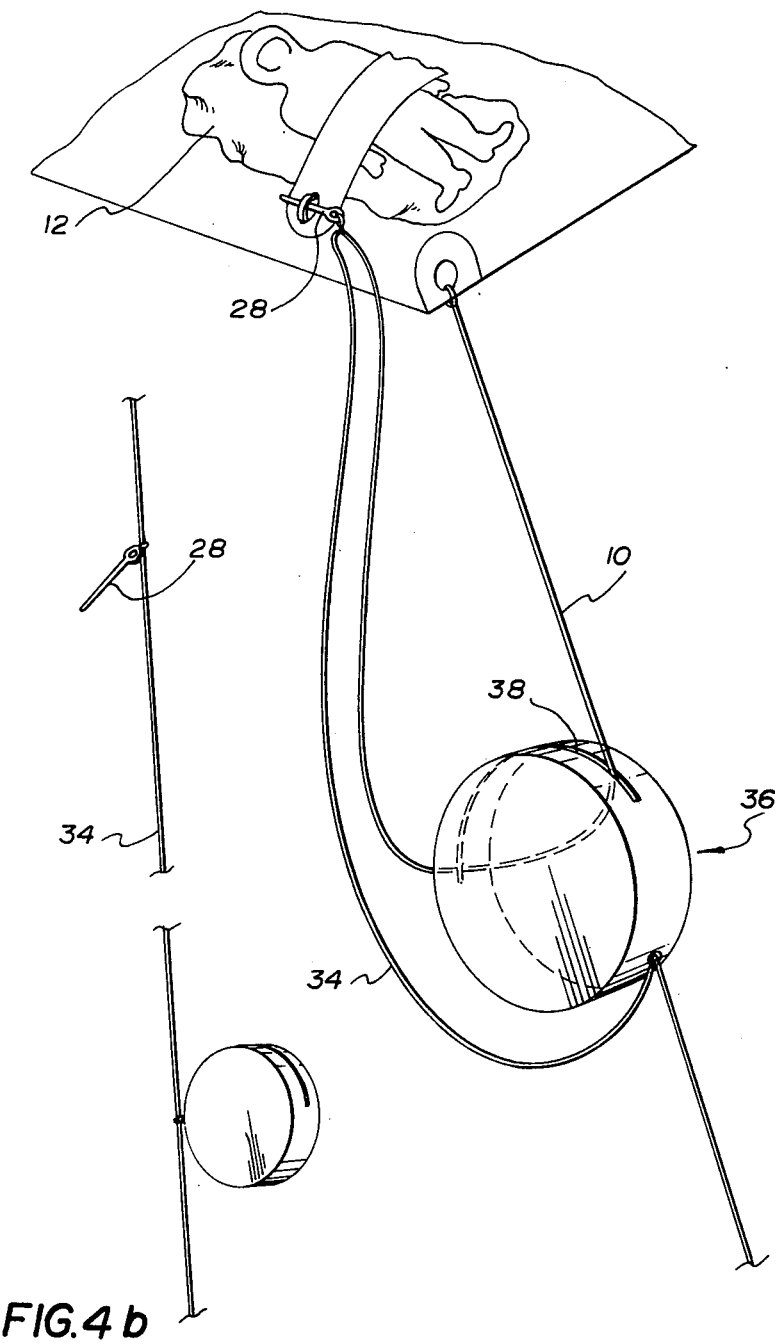
FIGS. 4A and 4B illustrate yet a further embodiment of the kite according to the present invention representing another kite string length changing means.

FIGS. 4A and 4B illustrate another mechanism whereby a loop 34 may be releasably provided in the kite string, to be maintained during normal flying of the kite, but to be released by a tug on the kite string such that pin 28 or other closure means is removed. This mechanism comprises rigid body 36 secured to kite string 10 at an upper location thereof. Groove 38 is provided in body 36, the width of the groove being less than the diameter of kite string such that the string can be releasably engaged therein and held during normal flying of the operation, for release therefrom when the kite string is pulled by the kite flyer. Thus, a loop 34 is made by fitting a portion of kite string 10 into groove 38 at a location spaced from the location where body 36 is fixed to the kite string so that sufficient slack on string 18 is provided. As seen in FIG. 5, the loop thus formed may itself be closure means string 18, this achieving the same results as the single string of FIGS. 1 to 3.

It will be understood that, in theory, the principle by which the parachute according to the present invention operates is that a single kite string is used, which kite string may be made longer by pulling or jerking the kite string from the ground. The distance between the kite string and the kite, at the point where it is secured to closure means string 18, is normally shorter than closure means string 18 such that string 18 remains slack during normal flying of the kite, while the parachute in it is held on the kite. When it is desired to release the parachute unit, however, by jerking the kite string the appropriate mechanism is activated to lengthen the kite string and tighten closure means string 18, this action removing the closure means from the strap or pocket and freeing parachute unit 12 to fall to the ground.

Thus it is apparent that there has been provided in accordance with the present invention a parachute dropping kite that fully satisfies the objects, aims and advantages set forth above. While the invention has been described in conjunction with specific embodiments thereof, it is evident that many alternatives, modifications and variations, beyond those which have been described herein, will be apparent to those skilled in the art in light of the foregoing description. As an example, the parachute pockets might be secured to the underneath side of the covering of the kite which does not have a kite guide as illustrated in the drawings herein. Accordingly it is intended to embrace all such alternatives, modifications and variations as fall within the spirit and broad scope of the appended claims.

I claim as my invention:

1. In a parachute dropping kite comprising a kite having a frame and a covering secured thereto, a kite string to extend from the kite to the operator when the kite is in flight, and a parachute unit releasably associated with the kite, the improvement wherein the kite is provided with: a holding means to releasably secure the parachute unit to the underside of the covering; a closure means removably, frictionally associated with the holding means; a closure means string, one portion thereof secured to the closure means and another portion thereof secured to the kite string at a position proximal to but spaced from the kite and of a length between these portions such that the closure means string is slack when the closure means is associated with the holding means during flight of the kite; and a kite string length changing means associated with the kite string at the position where the closure means string is secured to the kite string or between that position and the kite and actuable by tugging on the kite string when the kite is in flight to lengthen the kite string such that the closure means string becomes tightened and removes the closure means from the holding means to release the parachute whereby the parachute unit is released from its association with the kite whereby the parachute unit is released from its association with the kite; and wherein said kite string length changing means comprises a rigid body secured to the kite string at or above the position on the kite string where the closure means string is secured thereto, the body having a groove therein of a width less than the diameter of the kite string to releasably engage a portion of the kite string above that body and form a loop in the kite string, the groove being such that the loop is secured thereby against unpurposeful disengagement during flying of the kite, and such that, by tugging the kite string, the kite string is disengaged therefrom to open the loop and return the kite string to a length whereby the closure means string is tightened and removes the closure means.

2. A kite according to claim 1, wherein the closure means string in the loop, the closure means bring secured to a portion of the kite string which constitutes the loop when the kite string is releasably engaged by the groove of the body.

3. A kite according to claim 1, wherein the holding means comprises a strap, one end thereof being permanently secured to the parachute covering the other end being releasably securable to the covering by the closure means.

4. A kite according to claim 3, wherein the closure means comprises a pin to be frictionally secured to the releasable end of the strap and the covering.

5. A kite according to claim 1, wherein the holding means comprises a pocket opening downwardly when the kite is in normal flying orientation.

6. A kite according to claim 4, wherein the closure means comprises a clip removably secured to the cover of the kite to close the opening of the pocket.

7. A kite according to claim 5, wherein a kite guide is part of the covering, and wherein the pocket is secured to a side of the kite guide.

8. In a parachute dropping kite comprising a kite having a frame and a covering secured thereto, a kite string to extend from the kite to the operator when the kite is in flight, and a parachute unit releasably associated with the kite, the improvement wherein the kite is provided with: a holding means to releasably secure the parachute unit to the underside of the covering; a closure means removably, frictionally associated with the holding means; a closure means string, one portion thereof secured to the closure means and another portion thereof secured to the kite string at a position proximal to but spaced from the kite and of a length between these portions such that the closure means string is slack when the closure means is associated with the holding means during flight of the kite; and a kite string length changing means associated with the kite string at the position wherein the closure means string is secured to the kite string or between the position and the kite and actuable by tugging on the kite string when the kite is in flight to lengthen the kite string such that the closure means string becomes tightened and removes the closure means from the holding means to release the parachute whereby the parachute unit is released from its association with the kite; and wherein said kite string length changing means comprises a snap-together, two piece clamp, each piece of the clamp being secured to the kite string at a location spaced from the other and located at or above the position on the kite string where the closure means string is secured to the kite string such that, when the two pieces are snapped together, they form a loop and secure that loop against unpurposeful disengagement during flying of the kite, these pieces of the clamp being disengageable from each other by tugging the kite string, whereby the loop is opened and the kite string is returned to a length whereby the closure means string is tightened and removes the closure means, wherein a longitudinal kite guide is part of the covering, and wherein the holding means is secured to a side of said kite guide.

9. A kite according to claim 8, wherein the holding means comprises a strap, one end thereof being permanently secured to the parachute covering the other end being releasably securable to the covering by the closure means.

10. A kite according to claim 9, wherein the closure means comprises a pin to be frictionally secured to the releasable end of the strap and the covering.

11. A kite according to claim 8, wherein the holding means comprises a pocket opening downwardly when the kite is in normal flying orientation.

12. A kite according to claim 11, wherein the closure means comprises a clip removably secured to the cover of the kite to close the opening of the pocket.

13. A kite according to claim 12, wherein a kite guide is part of the covering, and wherein the pocket is secured to a side of the kite guide.

14. In a parachute dropping kite comprising a kite having a frame, a covering secured thereto, a kite guide as part of the covering, a kite string to extend from the kite to the operator when the kite is in flight, and a parachute unit releasably associated with the kite, the improvement wherein the kite is provided with: a holding means to releasably secure the parachute unit to the underside of the covering and comprising a pocket secured to a side of the kite guide and opening downwardly when the kite is in normal flying orientation; a closure means removably, frictionally associated with the holding means and comprising a clip removably secured to the cover of the kite to close the opening of the pocket; a closure means string, one portion thereof secured to the closure means and another portion thereof secured to the kite string at a position proximal to but spaced from the kite and of a length between these portions such that the closure means string is slack when the closure means is associated with the holding means during flight of the kite; and a kite string length changing means associated with the kite string at the position where the closure means string is secured to the kite string or between the position and the kite and actuable by tugging on the kite string when the kite is in flight to lengthen the kite string such that the closure means string becomes tightened and removes the closure means from the holding means to release the parachute whereby the parachute unit is released from its association with the kite; and wherein said kite string length changing means comprises a snap-together, two piece clamp, each piece of the clamp being secured to the kite string at a location spaced from the other and located at or above the position on the kite string where the closure means string is secured to the kite string such that, when the two pieces are snapped together, they form a loop and secure that loop against unpurposeful disengagement during flying of the kite, these pieces of the clamp being disengageable from each other by tugging the kite string, whereby the loop is opened and the kite string is returned to a length whereby the closure means string is tightened and removes the closure means.

15. In a parachute dropping kite comprising a kite having a frame, a covering secured thereto, a kite guide as part of the covering, a kite string to extend from the kite to the operator when the kite is in flight, and a parachute unit releasably associated with the kite, the improvement wherein the kite is provided with: a holding means to releasably secure the parachute unit to the underside of the covering and comprising a pocket secured to a side of the kite guide and opening downwardly when the kite is in normal flying orientation; a closure means removably, frictionally associated with the holding means and comprising a clip removably secured to the cover of the kite to close the opening of the pocket; a closure means string, one portion thereof secured to the closure means and another portion thereof secured to the kite string at a position proximal to but spaced from the kite and of a length between these portions such that the closure means string is slack when the closure means is associated with the holding means during flight of the kite; and a kite string length changing means wherein a portion of the kite string between the kite and where the closure means string is secured to the kite string is elastic, its elasticity being such as to permit the closure means string to remain slack during normal flying of the kite, but to cause the closure means to become tight and remove the closure means from the holding means when the kite string is tugged.

* * * * *